(12) United States Patent
Wang et al.

(10) Patent No.: US 6,438,431 B1
(45) Date of Patent: Aug. 20, 2002

(54) APPARATUS FOR RELAY BASED MULTIPLE POINT PROCESS FREQUENCY RESPONSE ESTIMATION AND CONTROL TUNING

(75) Inventors: Qing-Guo Wang; Chang Chieh Hang; Qiang Bi, all of Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/133,161

(22) Filed: Aug. 12, 1998

(30) Foreign Application Priority Data

Aug. 30, 1997 (SG) ............................................. 9703188

(51) Int. Cl.[7] ............................................. G05B 13/02
(52) U.S. Cl. ............................... 700/39; 700/29; 700/38
(58) Field of Search ............................. 700/28, 29, 30, 700/37, 38, 39, 54

(56) References Cited

U.S. PATENT DOCUMENTS

| | | | | |
|---|---|---|---|---|
| 4,549,123 A | | 10/1985 | Hagglund et al. .......... 318/610 |
| 5,283,729 A | * | 2/1994 | Lloyd .......................... 364/157 |
| 5,453,925 A | * | 9/1995 | Wojsznis et al. ............. 364/157 |
| 5,537,310 A | * | 7/1996 | Tanake et al. ............... 364/151 |
| 5,587,899 A | * | 12/1996 | Ho et al. ..................... 364/157 |
| 5,691,896 A | * | 11/1997 | Zou et al. .................... 364/157 |

* cited by examiner

*Primary Examiner*—Leo Picard
*Assistant Examiner*—Elliott Frank
(74) *Attorney, Agent, or Firm*—David H. Jaffer; Pillsbury Winthrop LLP

(57) ABSTRACT

Briefly, a preferred embodiment of the present invention includes an apparatus for tuning a regulator in a process controller. The digitized output from a standard relay and a parasitic relay are fed through digital to analog converter providing signals at $0.5\omega_c$, $\omega_c$ and $1.5\omega_c$ to the process, where $\omega_c$ is the process critical frequency. The apparatus records the digitized relay output u' and the digitized process output y' until stationary oscillations are reached. The outputs u' and y' are then used to calculate the process frequency response at $0.50\omega_c$, $\omega_c$ and $1.5\omega_c$. This data is then used to design the regulator, the output of which is converted to analog form and inputted to control the process.

6 Claims, 5 Drawing Sheets

Nyquist Plot

--- + --- Actual
—×— Estimated Under $N_1 =$ 10% Noise

Internal Model Control (IMC) system configuration

Step response of the process $G(s) = \dfrac{1}{(s^2 + 2s + 3)(s + 3)} e^{-2s}$

APPARATUS FOR RELAY BASED MULTIPLE POINT PROCESS FREQUENCY RESPONSE ESTIMATION AND CONTROL TUNING

BACKGROUND OF THE INVENTION

1. Field of the Invention

The present invention relates to closed loop systems having a regulator for control of a process, and more particularly to an apparatus for estimating the process frequency response and using the estimated frequency response to design the regulator.

2. Brief Description of the Prior Art

Controllers for tuning the response of a system or a process have been the subject of attention in the prior art. A typical block diagram of such a controller and process is shown in FIG. 1 wherein the output y of a process 10 is fed back through a feedback network 12, the output y' of which is subtracted from a reference signal r by a comparitor 14 which outputs an error signal e. A control circuit 16 is designed to respond to the error signal e by outputting a process control signal u for directing the process 10 to output a corrected y such that the error e is zero.

Achieving automatic tuning involves identification of the process 10, and the design of the controller 16. The control output u as a function of time is applied to the process 10 to assure the desired output y. It is generally convenient in analysis of such processes and control circuitry to mathematically transform the parameters from the time domain to a frequency domain. This process is done in electrical circuit analysis by means of the well known Fourier Transform. Manipulation of design parameters is much more conveniently achieved in a frequency domain. The frequency range of interest for such applications is usually from zero up to the process critical frequency $\omega_c$ i.e. the frequency at which the phase of a process frequency response crosses −180°. This critical frequency and the process frequency response at this point are useful for control analysis and design. For traditional frequency response identification, the frequencies of the exciting signals u fed into the process/system 10 should be carefully selected based on the process bandwidth. The use of relay feedback can automatically excite an unknown stable process around this frequency $\omega_c$. Such a method is described in U.S. Pat. No. 4,549,123 by Hagglund and Astrom. Furthermore, traditional frequency response identification usually involves an open loop test, while the use of relay feedback involves a closed-loop controller. A closed-loop test is preferred to an open-loop test in control applications, since it keeps the process close to the set point so that the process operates in a linear region where the frequency response is of interest.

Relay based process identification and control tuning have received a great deal of attention. The method of Astrom and Hagglund is useful in many process control applications, but it also faces two major problems. First, due to the use of a describing function approximation, the estimation of the critical point is not accurate enough for some kinds of processes. Second, the method of Astrom and Hagglund depends on the single critical point $\omega_c$, and only crude controller settings can be obtained based on this single point. Attempts have been made to solve this problem, including several modified identification methods using relay-based feedback control systems in order to identify more than one point on the process frequency response. In order to accomplish this, additional linear components (or varying hysteresis width) have been connected into the system requiring additional relay tests to be performed. These methods are time consuming and the resultant estimations are still approximate in nature since they rely on repeated use of the standard method as described in Astrom and Hagglund.

It is therefore clear that a method is needed whereby more points on the process frequency response can be accurately identified from a single relay test.

SUMMARY OF THE INVENTION

It is therefore an object of the present invention to provide an improved apparatus for process frequency response estimation and controller tuning.

It is a further object of the present invention to provide an apparatus for process frequency response estimation and controller tuning for accurately identifying multiple points on the process frequency response with a single relay test.

It is a still further object of the present invention to provide an apparatus for process frequency response estimation and controller tuning for accurately identifying multiple points on the process frequency response with a single relay test, whereby the controller regulator is tuned with respect to the identified points on the process frequency response, whereby the controller system achieves an improved, uniform response.

Briefly, a preferred embodiment of the present invention includes an apparatus for tuning a regulator in a process controller. The digitized output from a standard relay and a parasitic relay are fed through a digital to analog converter providing signals at $0.5\, \omega_c$, $\omega_c$ and $1.5\, \omega_c$, to the process, where $\omega_c$ is the process critical frequency. The apparatus records the digitized relay output u' and the digitized process output y' until stationary oscillations are reached. The outputs u' and y' are then used to calculate the process frequency response at $0.5\, \omega_c$, $\omega_c$ and $1.5\, \omega_c$. This data is then used to design the regulator, the output of which is converted to analog form and inputted to control the process.

An advantage of the auto-tuner of the present invention is that it can estimate multiple points on a process frequency response simultaneously with one single relay test, resulting in time savings.

A further advantage of the present invention is that it gives accurate results since no approximations are made, and the computations involved are simple so that it can be easily implemented on microprocessors.

A still further advantage of the present invention is that the method is insensitive to noise and step-like load disturbances, and non-zero initial conditions.

Another advantage of the present invention is that the controller tuning methods employed work well for the general class of linear processes with different dynamics, achieving consistent satisfactory responses.

IN THE DRAWING

DESCRIPTION OF THE PREFERRED EMBODIMENT

Figure 1:
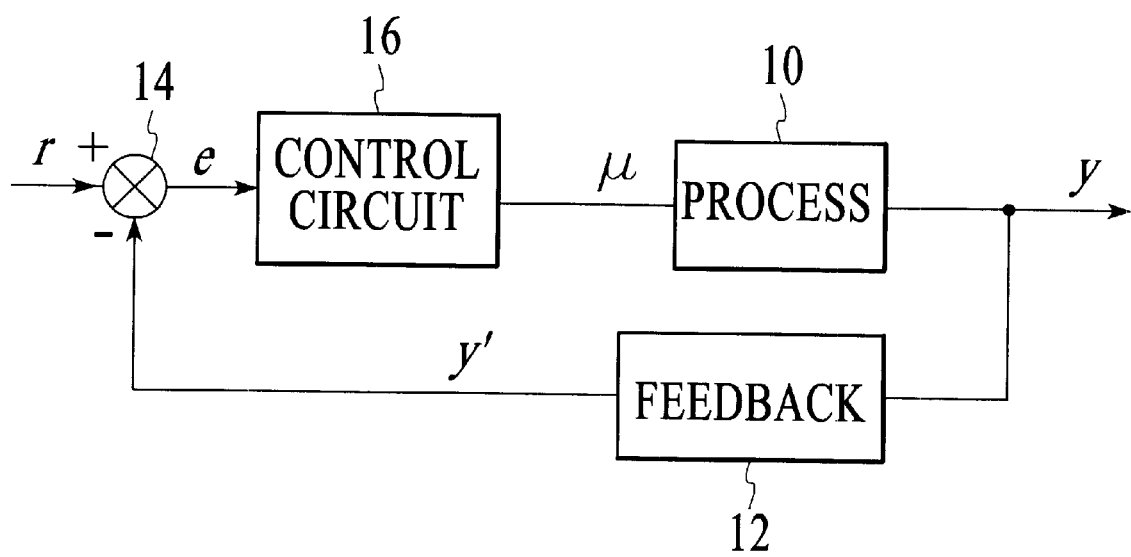
FIG. 1 shows a prior art process control system.
Figure 2:
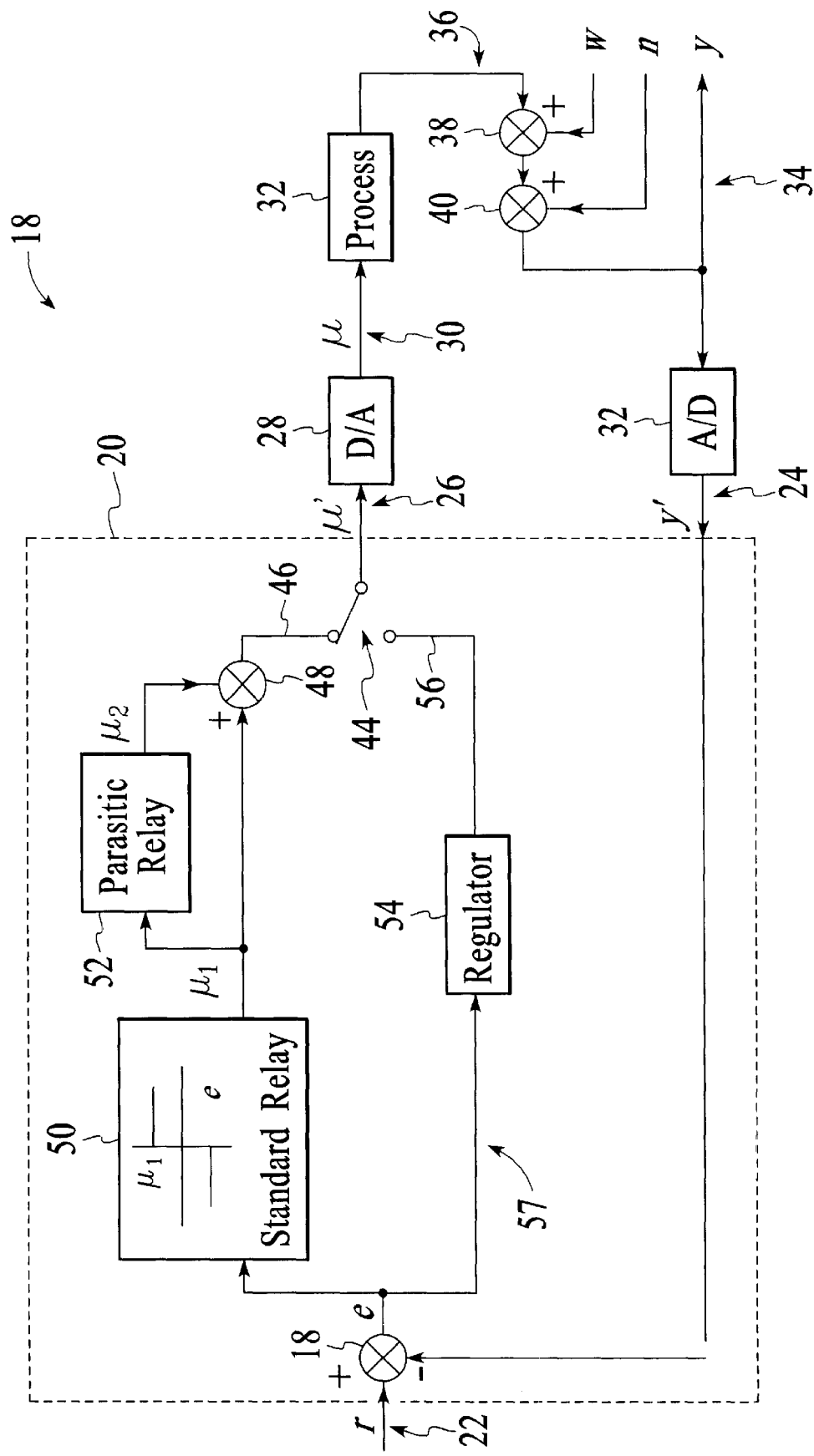
FIG. 2 is a block diagram of the preferred embodiment of the present invention.

Referring now to FIG. 2 of the drawing, a preferred embodiment of the system of the present invention 18 is shown to include an auto-tuner 20 which is responsive to a digitized reference signal r at input 22 and a digitized process output signal y' at input 24 to provide signals u' at output 26.

The digitized signals u' are converted to analog signals u by digital to analog converter 28 and outputted at 30 to the process 32. The output y at 34 of the system 18 is shown schematically to include the sum of the output at 36 of process 32, and noises n and disturbances w, the addition schematically illustrated through use of summing networks 38 and 40. The output y is converted by analog to digital converter 42 to provide the digitized input y' at 24.

The functions performed by the auto-tuner 20 are schematically illustrated inside the auto-tuner 20 block.

The objective of the auto-tuner 20 is to automatically identify i.e., estimate the frequency response/dynamics of the process 32, and then to automatically design/configure a regulator to control the output y of the process 32 according to the applied reference signal r.

A more detailed description of the functions performed by the auto-tuner 20 will now be given in reference to the circuitry illustrated in FIG. 2 inside the auto-tuner 20 block. In order to identify the frequency response of the process 32, the switch 44 is set to connect the output 46 of summing network 48 to the input 26 of the digital to analog converter 28. In this mode, the signal output at 46, provided by the relays 50 and 52, controls the process 32. The digitized process input u' at 26 and digitized process output y' at 24 are then recorded by conventional circuitry (not shown) until stationary oscillations are reached i.e., until there are no variations in amplitude or period of oscillations in the output y. The output at 46 includes process excitation frequencies including $0.5\,\omega_c$, $\omega_c$ and $1.5\,\omega_c$, and in response, the output y of the process also contains these frequencies. When the stationary oscillation condition is reached, the recorded/saved u' and y' are then used to compute the process 32 frequency response data at the frequencies $0.5\,\omega$, $\omega_c$ and $1.5\,\omega_c$ using equations 2 and 3, which will now be described in detail. The auto-tuner 20 circuitry then uses the calculated process frequency response data to design the regulator 54. When the regulator 54 is determined, the switch 44 is activated to connect the regulator output 56 to the input 26 of the digital to analog converter 28. At this point the regulator 54 responds to the regulator input e at 57, e being the difference between the digital reference r and digitized process output y' by applying a signal u', which converted by digital to analog converter 28, provides the signal u to the processor to drive the processor to output ay at 34 corresponding to the reference r.

The procedure described above and with the following text as performed by the auto-tuner 20 can be implemented in a computer, the inputs being the digital reference r and the digitized process output y', and the output being the digital control signal u'. In addition to the specific blocks noted within block 20, block 20 also represents the digital apparatus responsive to r and y' for calculating the process frequency response, and for calculating the required regulator parameters and setting the regulator as required. Such operations performed according to the equations disclosed will be understood by those skilled in the art.

As discussed above, FIG. 2 is an arrangement of apparatus for automatically estimating a process frequency response and designing a process regulator. The details of the process frequency estimating apparatus will now be described in detail.

Assume that initially, process 32 runs in open loop. Then a standard relay 50 and the novel parasitic relay 52 of the present invention are applied to process 32. This results in input and output time responses u(t) and y(t) of process 32. u(t) and y(t) are sampled at a sampling period of T and are recorded until stationary limit cycles of u(t) and y(t) have been reached.

The key of the present invention is the modified relay which consists of the standard relay 50 and parasitic relay 52, as shown in FIG. 2. The standard relay operates as usual with the amplitude of the sampled output $u_1(k)$ being h, where $u_1(k)$ is the k-th sample of $u_1(t)$. It is well known that the standard relay can excite process 32 mainly at frequency $\omega_c$. In order to provide excitation of the process 32 at frequencies other than $\omega_c$, for use in control while maintaining the process output oscillation under such an arrangement, a parasitic relay 52 with output amplitude $\alpha h$ and twice the period of $u_1(k)$ is introduced and superimposed on $u_1(k)$. This implies that the output $u_2(k)$ of the parasitic relay 52 flip-flops once every period of oscillation in $u_1(k)$. The parasitic relay 52 output $u_2(k)$ is described by the following equations, $$\begin{cases} u_2(0) = \alpha h; \\ u_2(k) = -\alpha h \cdot \text{sign}(u_2(k-1)), \text{ if } u_1(k-1) > 0 \text{ and } u_1(k) < 0; \\ u_2(k) = u_2(k-1), \text{ otherwise;} \end{cases} \quad (1)$$

wherein the term "sign" is defined by $$y = \text{sign}(x) = 1 \text{ for } x \geq 0$$

$$y = \text{sign}(x) = -1 \text{ for } x < 0$$

where $\alpha$ is a constant coefficient. $\alpha$ should be large enough to have sufficient stimulation on the process 32 and it should also be small enough such that the parasitic relay 52 will not change the period of oscillation generated by the main relay 50 too much. The preferred range of values for $\alpha$ is from 0.1~0.3. The output at 46 of the modified relay apparatus is thus given by $u(k) = u_1(k) + u_2(k)$, and is sent as the input to process 32.

Figure 3A:
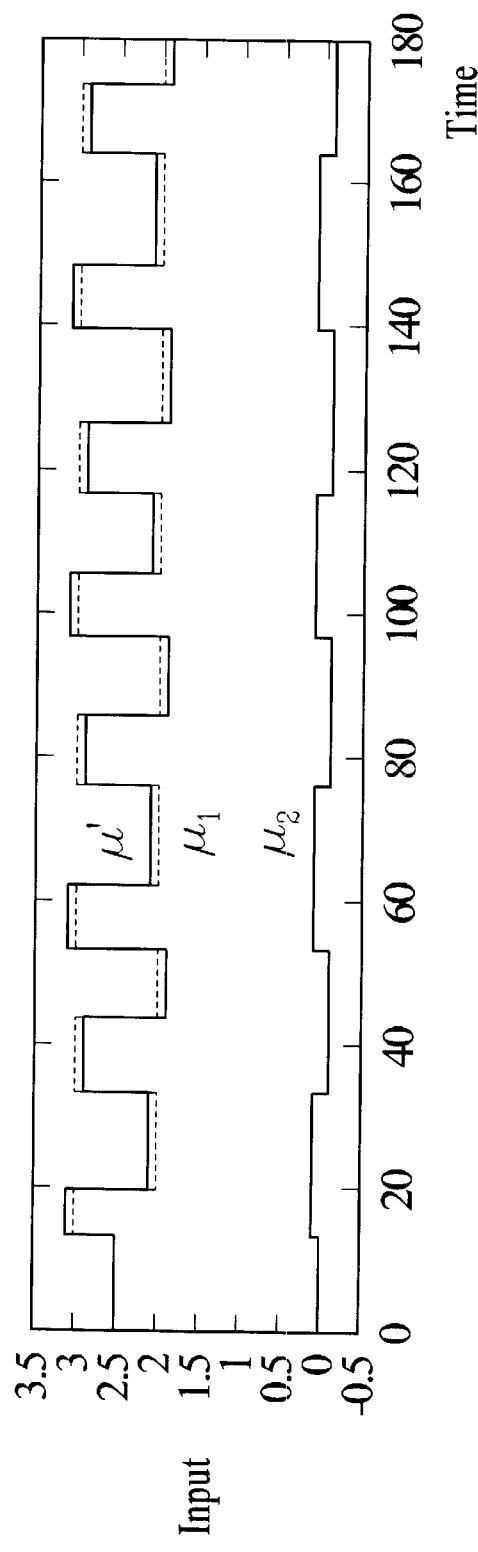
FIG. 3A shows the digitized modified relay output for the process frequency response estimation relay test
Figure 3B:
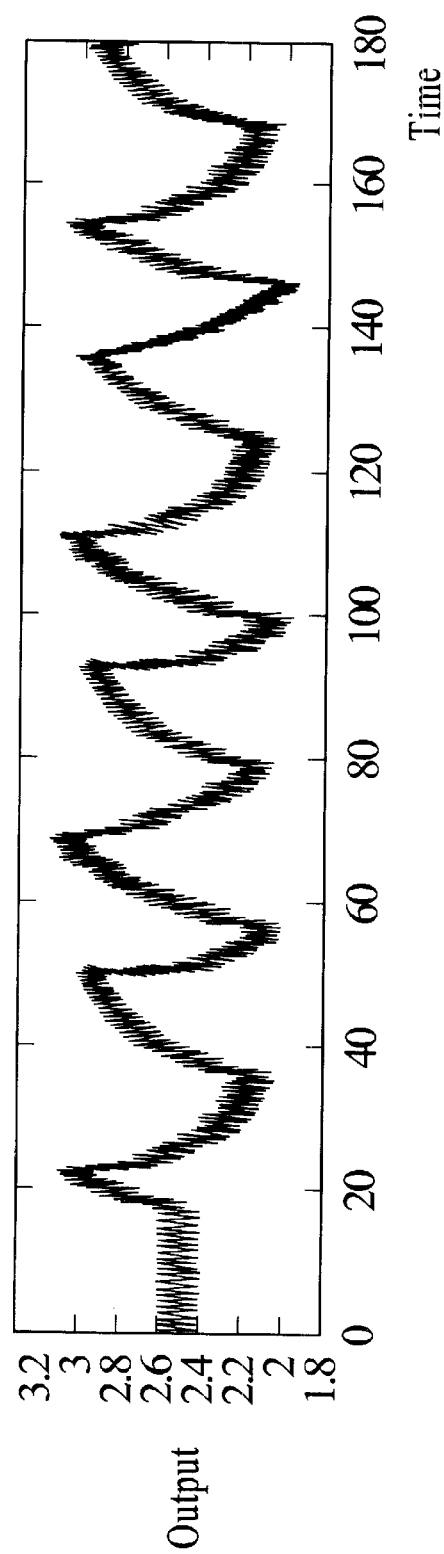
FIG. 3B shows the process output during the relay test.

In this way, the process is stimulated by two different excitations whose periods are $T_c$ and $2T_c$ respectively. The digital input u' at 26 resulting from the modified relay apparatus is shown in FIG. 3A. The output y at 34 from the process 32 will appear as shown in FIG. 3B, and will reach a stationary oscillation with the period being $2T_c$. Due to two excitations in u, y consists of frequency components at $$\frac{2\pi}{T_c}, \frac{\pi}{T_c}$$

and their odd harmonics $$\frac{6\pi}{T_c}, \frac{10\pi}{T_c}, \ldots \text{ and } \frac{3\pi}{T_c}, \frac{5\pi}{T_c}, \ldots \text{ respectively.}$$

For linear process 32, the process frequency response can be obtained by $$G(j\omega_i) = \frac{\int_0^{2T_c} y_s(t)e^{-j\omega_i t} dt}{\int_0^{2T_c} u_s(t)e^{-j\omega_i t} dt}, i = 1, 2, \ldots, \quad (2)$$

where $$\omega_i = \frac{(2i-1)2\pi}{2^l T_c}, l = 0, 1,$$

are the basic frequency and its odd harmonic frequencies in $u_s$ and $y_s$. $u_s$ and $y_s$ have a period ($2T_c$) related to the stationary oscillations of u(k) and y(k) respectively. $G(j\omega_i)$ in (2) can be computed using the FFT (fast fourier transform) algorithm as $$G(j\omega_i) = \frac{FFT(y_s)}{FFT(u_s)} \quad (3)$$

The spectrum analysis method used by the auto-tuner 20 in estimating the process frequency response gives a more accurate result than methods relying on the describing function. The method of the present invention employs the FFT only once and the required computation burden is modest. It can identify multiple points on the process frequency response from a single test using the modified relay of the present invention. Moreover, the method can be easily extended to find additional points on the frequency response. One can flip-flop the parasitic relay every $3^{rd}$ or $4^{th}$ period of the main oscillations generated by the standard relay and get other frequency points. One can also use more than one parasitic relay in a relay test and find more points on the frequency response in one relay test. To estimate the static gain of a process, either a small set-point change at reference may be introduced or a bias may be added to the modified relay.

Figures 4, 5:
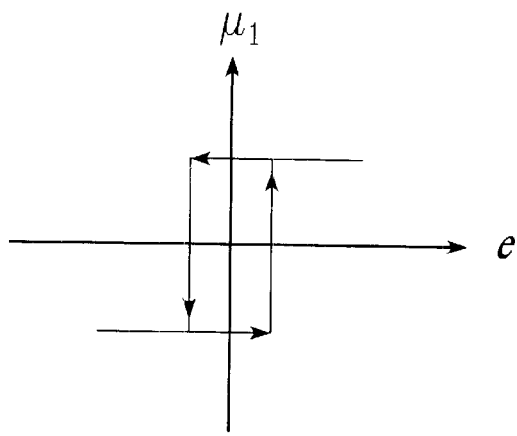
FIG. 4 illustrates a relay with hysteresis for noise reduction.
FIG. 5 is a Nyquist plot.

In a realistic environment, the major concerns for any identification method are disturbance and noise. It should be noted that the identification method is unaffected by the step-like load disturbance w referred to in FIG. 2, which is a common case in practice. This can easily be shown from (2) as $$\begin{aligned}
\frac{\int_0^{2T_c} \tilde{y}_s(t)e^{-j\omega_i t} dt}{\int_0^{2T_c} \tilde{u}_s(t)e^{-j\omega_i t} dt} &= \frac{\int_0^{2T_c} [y_s(t)+w(t)]e^{-j\omega_i t} dt}{\int_0^{2T_c} (u_s(t)+\bar{u})e^{-j\omega_i t} dt} \\
&= \frac{\int_0^{2T_c} y_s(t)e^{-j\omega_i t} dt + w\int_0^{2T_c} e^{-j\omega_i t} dt}{\int_0^{2T_c} u_s(t)e^{-j\omega_i t} dt + \bar{u}\int_0^{2T_c} e^{-j\omega_i t} dt} \\
&= \frac{\int_0^{2T_c} y_s(t)e^{-j\omega_i t} dt}{\int_0^{2T_c} u_s(t)e^{-j\omega_i t} dt} = G(j\omega_i), i = 1, 2, \ldots
\end{aligned} \quad (4)$$

where $\omega_i$ has the same definition as in (2). The modified relay estimating apparatus of the auto-tuner 20 of the present invention is also insensitive to noise. A preferred method of reducing the noise in the process output y(t) is by introducing a hysteresis in the standard relay 50. This is illustrated in FIG. 4. The width of hysteresis should be bigger than the noise band and is usually chosen to be 2 times larger than the noise band. Filtering is another possibility. To reduce the effect of noise further, especially in the case of large noise-to-signal ratios, the estimator uses the average of the last 2–4 periods of oscillation as the stationary oscillation period, depending on the noise level. With these anti-noise measures, the method of the present invention can reject noise very effectively, and provide accurate frequency response estimation at frequencies of 0.5 $\omega_c$, $\omega_c$ and 1.5 $\omega_c$. It should be also noted that a non-zero initial condition of the process at the start of a relay test has no effect on the estimation because only stationary oscillations $u_s$ and $y_s$ after transient are used in the estimation, where $u_s$ and $y_s$ are independent of the initial condition.

EXAMPLE.

In order to test the method in a realistic environment, extensive real-time relay testing was performed using the Dual Process Simulator KI 100 from KentRidge Instruments, Singapore. For illustration, a process was configured on the Simulator as $$G(s) = \frac{1}{5s+1} e^{-5s}$$

In the test, the standard relay amplitude was chosen as 0.5 and the parasitic relay height was set to 20%×0.5. Without additional noise, the noise-to-signal ratio of the inherent noise in the test environment was measured at $N_1$=0.025%, where $N_1$ is defined as $$N_1 = \frac{\text{mean power spectrum density of noise}}{\text{mean power spectrum density of signal}}$$

or as $N_2$=4%, where the noise-to-signal ratio $N_2$ is $$N_2 = \frac{\text{mean (abs(noise))}}{\text{mean (abs(signal))}}$$

The identification error ERR is 2.5%, where $$ERR = \max_i \left\{ \left| \frac{\hat{G}(j\omega_i) - G(j\omega_i)}{G(j\omega_i)} \right| \times 100\%, i = 1, 2, 3 \right\}$$

in which $G(j\omega_i)$ and $\hat{G}(j\omega_i)$ are the actual and the estimated process frequency responses respectively. To see noise effects, extra noise was introduced with the noise source in the Simulator. Time sequences of y(t) and u(t) in a relay test under $N_1$=10% ($N_2$=31%) are shown in FIGS. 3A and 3B. The first part of the test in FIGS. 3A and 3B (t=0~12) was the "listening period", in which the noise bands of y(t) and u(t) at the steady state were measured. Under this noise, the hysteresis was chosen as 0.3. With averaging 4 periods of stationary oscillations, the estimated frequency response points under this noise level are shown in FIG. 5.

Upon completion of the process frequency response estimation, the auto-tuner uses the estimated data to automatically design the regulator 54. This process will now be described in detail.

The three estimated points of frequency response are used for tuning the regulator 54 in FIG. 2. The three points are first converted into a second order plus dead time model with the following structure $$\hat{G}(s) = \frac{e^{-sL}}{as^2 + bs + c}, \quad (5)$$

where a, b, c and L are unknowns to be determined. It follows that $$\hat{G}(j\omega_i) = \frac{1}{(j\omega_i)^2 a + j\omega_i b + c} e^{-j\omega_i L}, \; i = 1, 2, 3. \quad (6)$$

The magnitude of both sides of (6) is taken as $$[\omega_i^4 \, \omega_i^2 \, 1]\theta = \frac{1}{|G(j\omega_i)|^2}, \; i = 1, 2, 3. \quad (7)$$

where $$\theta = [a^2 \; b^2 - 2ac \; c^2]^\tau.$$

Then, $$[a \; b \; c] = \left[ \sqrt{\theta_1} \; \sqrt{\theta_2 + 2\sqrt{\theta_1 \theta_3}} \; \sqrt{\theta_3} \right]$$

In addition, the phase relation in (6) gives $$\omega_i L = -\arg[G(j\omega_i^*)] - \tan^{-1}\left( \frac{b\omega_i}{c - a\omega_i^2} \right), \; i = 1, 2, 3. \quad (8)$$

It will be clear to those skilled in the art that L can be obtained with the least squares method.

With the model in (5) for the process available, a controller can be designed. A PID controller can be written in the form:

$$K(s) = k\left( \frac{As^2 + B + C}{s} \right), \quad (9)$$

where $$A = \frac{K_D}{k}, \; B = \frac{K_P}{k}, \; C = \frac{K_I}{k} \quad (10)$$

The controller zeros are chosen to cancel the model poles, i.e. A=a, B=b, C=c, where a, b and c are the model parameters determined from (7) and (8). Then the resultant open-loop transfer function G(s) K(s) is approximated by $$\hat{G}(s)k(s) = \frac{ke^{-sL}}{s}. \quad (10)$$

Its closed-loop poles can be selected from the root locus of the loop by assigning a proper value for k.

For the transfer function in (10), real or complex roots may be obtained for the closed-loop. In the method of the present invention, the controller zeros have been chosen to cancel the model poles. Exact cancellation is never expected since the process can be of any order while the model is only of second order. For highly oscillatory processes, it is possible that the uncanceled dynamics will drive the system to heavy oscillation, and hence it is reasonable not to create additional oscillatory dynamics by having complex close-loop poles. Real closed-loop poles are chosen for the system instead. On the other hand, for non-oscillatory or lightly oscillatory processes, the uncanceled dynamics will not bring the system to severe oscillation, and hence it is advisable to introduce some overshoot by selecting complex closed-loop poles so as to speed up the response.

For ease of presentation, some terms will now be defined that will be used in the following description. The equivalent time constant $\tau_o$ of a process is inversely proportional to its speed of response. For monotonic processes, the speed of response is reflected by the locations of the dominant poles. For oscillatory ones, it is related to the real part of the complex poles which determines the system attenuation and hence serves as a measure of the process speed. According to equivalent time principles, we have $$\frac{1}{\tau_o} = \begin{cases} \dfrac{c}{\sqrt{b^2 - 2ac}}, & b^2 - 4ac \geq 0; \\ \dfrac{b}{2a} & b^2 - 4ac < 0 \end{cases} \quad (11)$$

where a, b and c are model parameters that can be obtained from (7). Another variable of interest to the design method is the damping ratio $\zeta_o$ of the open-loop plant which is defined as $$\zeta_o = \begin{cases} \dfrac{b}{2\sqrt{ac}}, & b^2 - 4ac < 0; \\ 1, & b^2 - 4ac \geq 0. \end{cases} \quad (12)$$

with a, b and c being the model parameters. The solution will now be presented by separating it into three cases.

Case I. $\zeta > 0.7071$ or $$\frac{L}{\tau_o} < 0.15 \; \text{or} \; \frac{L}{\tau_o} > 1.$$

Complex closed-loop poles on the root locus are chosen based on the reasoning given earlier. In order for a pair of the desired poles $$s = -\omega_n \zeta_n \pm j\omega_n \sqrt{1 - \zeta_n^2}$$

where $\zeta_n$ is the closed-loop damping ratio, to be on the root locus for the system in (10), the phase condition $$-\omega_n \sqrt{1-\zeta_n^2} L - (\pi - \cos^{-1}\zeta_n) = -\pi \quad (13)$$

has to be satisfied, giving $$\omega_n = \frac{\cos^{-1}\zeta_n}{L\sqrt{1-\zeta_n^2}}. \quad (14)$$

The magnitude condition then assigns the value of k to $$k = \omega_n e^{-\omega_n L \zeta_n}. \quad (15)$$

Simulation results show that the feedback system gives satisfactory responses if closed-loop poles of damping ratio $\zeta_n = 0.7071$ are chosen. Substituting $\zeta_n = 0.7071$ into eq. (14) and (15) results in $$k = \frac{0.5064}{L} \quad (16)$$

Case II. $\zeta_o \leq 0.7071$ or $$0.15 \leq \frac{L}{\tau_o} \leq 1.$$

In this case, we choose the closed-loop poles as real double poles on the root-locus. Its location is selected to have a similar response speed to that of the open-loop one if it is achievable, i.e. it is before the breakaway point. Otherwise the breakaway point will be used. In order for $$s_{1,2} = -\frac{l}{\tau_o}$$

to be on the root locus, $$k = \frac{l}{\tau_o} e^{-\frac{L}{\tau_o}}. \quad (17)$$

To find the breakaway point, it is noted from eq. (14) that $$\lim_{\zeta_n \to 1} \omega_n = \lim_{\zeta \to 1} \left( \frac{\cos^{-1} \zeta_n}{L\sqrt{1-\zeta_n^2}} \right) = \frac{1}{L} \quad (18)$$

Hence, the breakaway point is $$s_{1,2} = -\omega_n \zeta_n \pm j\omega_n \sqrt{1-\zeta_n^2} = -\frac{1}{L}$$

and the corresponding gain is $$k_{break} = -se^{sL}\big|_{s=-\frac{1}{L}} = \frac{1}{eL} \quad (19)$$

Therefore, the value of k should be taken as $$k = \min\left\{ \frac{l}{\tau_o} e^{-\frac{L}{\tau_o}}, \frac{l}{eL} \right\} \quad (20)$$

Case III.

$$\frac{L}{\tau_o} > 2.$$

Figure 6:
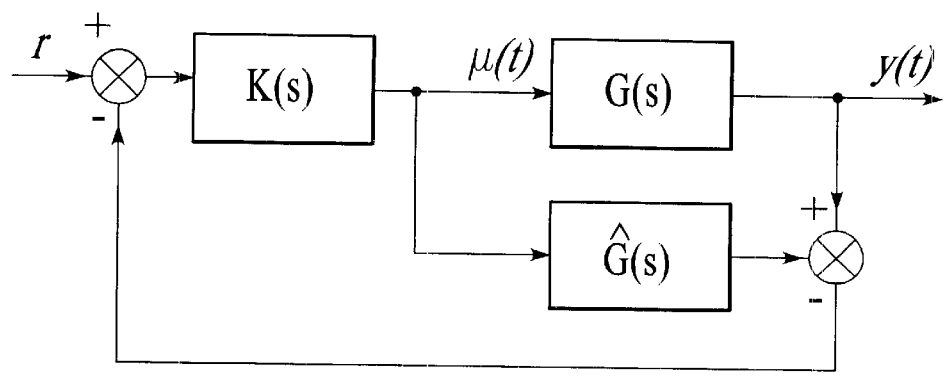
FIG. 6 shows a regulator using an IMC systems configuration.

Processes with long dead time tend to produce very slow responses. In fact, the single-loop structure is inadequate in handling such processes. One possible solution is to apply the Internal Model Control (IMC) strategy to compensate for the long dead time. The controller structure is shown in FIG. 6. The model of the process is denoted as $\hat{G}(s)$ in the figure, and $$\hat{G}(s) = \frac{e^{-sL}}{as^2 + bs + c}$$

where the parameters a, b ,c and L are given in (7)–(8). The controller is now modified to $$K(s) = \frac{as^2 + bs + c}{\left(\frac{1}{\alpha}s\tau_o + 1\right)^2} \quad (21)$$

where $\tau_o$ is the equivalent time constant defined in (11) and $\alpha$ is a design parameter to adjust the speed of response. The larger the value of $\alpha$, the faster the response becomes. The typical range of $\alpha$ is $\alpha \in [0.5, 5]$. If the model is exact, the system will have an equivalent transfer function of $$H_{yr}(s) = \frac{1}{\left(\frac{1}{\alpha}s\tau_o + 1\right)^2} e^{-sL} \quad (22)$$

The dead time is therefore brought out of the loop, and the speed can be chosen to be as fast as desired by selecting a large $\alpha$ value. Since this inevitably increases the size of the control effort, the limit is set by the saturation of the control signal and the accuracy of the model.

When the regulator 54 in FIG. 2 is designed, the switch 44 is connected to the lower node 56, and the auto-tuning is completed.

EXAMPLE

Consider the following long dead time process given by the transfer function $$G(s) = \frac{1}{(s^2 + 2s + 3)(s + 3)} e^{-2s}$$

The model of the process is found to be $$\hat{G}(s) = \frac{1}{2.921s^2 + 6.536s + 9.031} e^{-2.289s}$$

The PID controller is designed to be $$K(s) = 1.446 + \frac{1.998}{s} + 0.646s.$$

Since the process is dead time dominated, the IMC approach can be employed to speed up the response. Choosing the value of $\alpha=2$ in eq. (21), the controller is computed to be $$K(s) = \frac{2.921s^2 + 6.536s + 9.031}{\left(\frac{1}{2} \times 0.894s + 1\right)^2}$$

Figure 7:
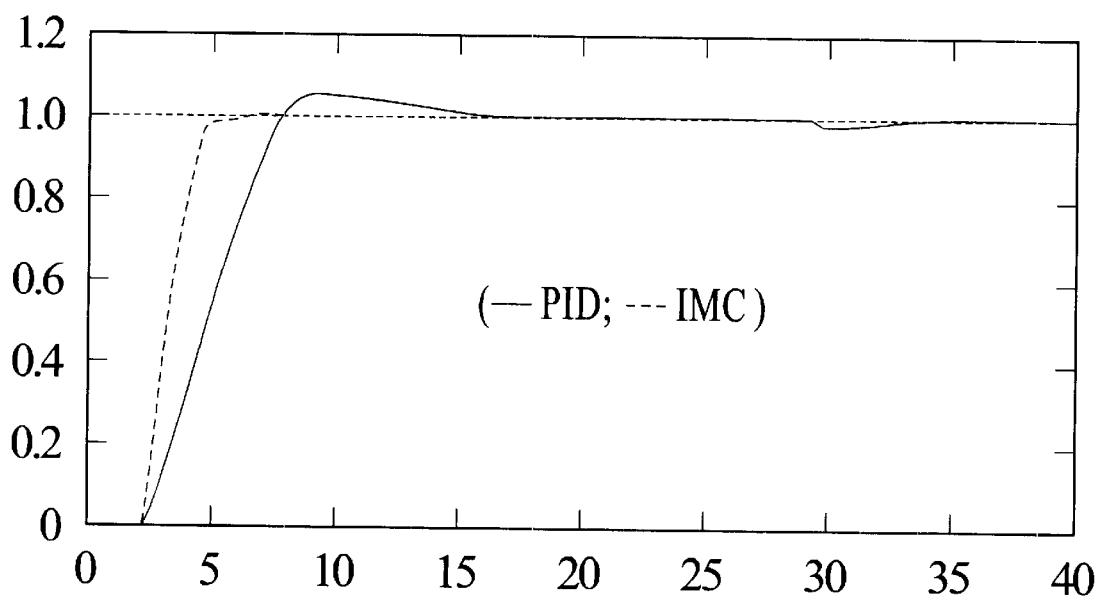
FIG. 7 shows the results of PID and IMC regulator designs.

The control performance of the IMC and PID controllers is also shown in FIG. 7. The performance of the IMC controller is an improvement over the PID controller. The speed is much increased, and the settling time and overshoot are significantly reduced.

Although a preferred embodiment of the present invention has been described above, it will be appreciated that certain alterations and modifications thereof will be apparent to those skilled in the art. It is therefore intended that the appended claims be interpreted as covering all such alterations and modifications as fall within the true spirit and scope of the invention.

What is claimed is:

1. An apparatus for estimating a frequency response of a linear stable process comprising:

(a) signal excitation means for providing a process control signal including a process critical frequency and a plurality of signals of different frequencies wherein said signal excitation means includes
  (i) a standard relay for providing said process critical frequency;
  (ii) a parasitic relay for providing a signal at one half said process critical frequency; and
(b) identification means based on a fast fourier transform for estimating a plurality of points on said frequency response of said process from input and output stationary oscillations of said process.

2. An apparatus as recited in claim 1 wherein said parasitic relay is set to flip-flop every k-th period of said standard relay, where k is selected from the group including positive integers.

3. An apparatus as recited in claim 1 wherein an output of said standard relay and said parasitic relay can be biased to output a signal indicative of an estimate of a static gain of said process.

4. An apparatus for tuning a regulator in a controller of a process comprising:
  (a) means for estimating a frequency response of said process including
    (i) signal excitation means for providing a process control signal including a process critical frequency, and a plurality of signals of different frequencies wherein said signal excitation means includes
      (a) a standard relay for providing said process critical frequency;
      (b) a parasitic relay for providing a signal at one half said process critical frequency; and
    (ii) identification means based on a fast fourier transform for estimating a plurality of points on said frequency response of said process from input and output stationary oscillations of said process; and
  (b) regulator design means for calculating parameters of a regulator, said design means using said plurality of points on said frequency response of said process.

5. An apparatus as recited in claim 4 wherein said parasitic relay is set to flip-flop every k-th period of said standard relay, where k is selected from the group including positive integers.

6. An apparatus is recited in claim 4 wherein an output of said standard relay and said parasitic relay can be biased to output a signal indicative of an estimate of a static gain of said process.

* * * * *